United States Patent
Blackmon et al.

(10) Patent No.: US 6,628,662 B1
(45) Date of Patent: Sep. 30, 2003

(54) METHOD AND SYSTEM FOR MULTILEVEL ARBITRATION IN A NON-BLOCKING CROSSBAR SWITCH

(75) Inventors: Herman Lee Blackmon, Rochester, MN (US); Robert Allen Drehmel, Goodhue, MN (US); Kent Harold Haselhorst, Byron, MN (US); James Anthony Marcella, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/450,792

(22) Filed: Nov. 29, 1999

(51) Int. Cl.[7] .......................................... H04L 12/413
(52) U.S. Cl. ........................ 370/447; 370/461; 370/462; 710/113; 710/241
(58) Field of Search ................................. 370/422, 423, 370/425, 426, 461, 462, 229, 230, 235, 445, 446, 447, 448, 458; 710/100, 109, 113, 114, 240, 241, 316, 317, 107; 709/238, 240, 244

(56) References Cited

U.S. PATENT DOCUMENTS

| | | | |
|---|---|---|---|
| 4,845,722 A | 7/1989 | Kent et al. | 370/58 |
| 5,179,669 A | 1/1993 | Peters | 395/325 |
| 5,561,784 A | 10/1996 | Chen et al. | 395/484 |
| 5,799,209 A | 8/1998 | Chatter | 395/876 |
| 5,889,969 A | 3/1999 | Getzlaff et al. | 395/293 |
| 5,949,982 A * | 9/1999 | Frankeny et al. | 710/317 |
| 6,125,429 A * | 9/2000 | Goodwin et al. | 711/143 |
| 6,292,705 B1 * | 9/2001 | Wang et al. | 700/5 |
| 6,487,621 B1 * | 11/2002 | MacLaren | 710/240 |

* cited by examiner

Primary Examiner—Ricky Ngo
Assistant Examiner—Christopher M. Swickhamer
(74) Attorney, Agent, or Firm—Roy W. Truelson

(57) ABSTRACT

A method and system for arbitrating data transfers between devices connected via electronically isolated buses at a switch. In accordance with the method and system of the present invention, multiple arbitration controllers are interposed between devices and a switch to which the devices are connected, wherein each of the multiple arbitration controllers are effective to select a data transfer operation and detect collisions between said selected data transfer operations. The switch is enabled for any selected data transfer operations between which collisions are not detected. The switch is also enabled for only one of the selected data transfer operations between which collisions are detected. Any selected data transfer operations for which the switch is not enabled are deferred. The deferred data transfer operations are prioritized within the multiple arbitration controllers, such that for a subsequent selection of the deferred data transfer operations, the switch is enabled for the deferred data transfer operations.

10 Claims, 4 Drawing Sheets

Fig. 3

| Time | Port E Arbiter (70) | Priority (76) | Toggle Bit (74) | Port F Arbiter (72) | Priority (78) |
|---|---|---|---|---|---|
| N | → E to A (WINs) | 0 | E | → F to A (LOSEs) | 0 |
|  | A | 0 |  | A | 0 |
|  | B | 0 |  | B | 0 |
|  | C | 0 |  | C to F | 0 |
|  | D | 0 |  | D to F | 0 |
| N+1 | E to A (data) | 0 | F | F to A | 1 |
|  | A | 0 |  | A | 0 |
|  | → B to E (WINs) | 0 |  | B | 0 |
|  | C | 0 |  | → C to F (WINs) | 0 |
|  | D | 0 |  | D to F | 0 |
| N+2 | → E broadcast (LOSEs) | 0 | F | F to A | 1 |
|  | A | 0 |  | A | 0 |
|  | B to E (data) | 0 |  | B | 0 |
|  | C | 0 |  | C to F (data) | 0 |
|  | D | 0 |  | → D to F (WINs) | 0 |
| N+3 | → E broadcast (WINs) | 1 | E | → F to A (LOSEs) | 1 |
|  | A | 0 |  | A | 0 |
|  | B | 0 |  | B to F | 0 |
|  | C | 0 |  | C | 0 |
|  | D | 0 |  | D to F (data) | 0 |
| N+4 | → E broadcast (data) | 0 | F | → F to A (WINs) | 1 |
|  | A | 0 |  | A | 0 |
|  | B | 0 |  | B to F | 0 |
|  | C | 0 |  | C | 0 |
|  | D | 0 |  | D | 0 |
| N+5 | → E | 0 | F | F to A (data) | 0 |
|  | A | 0 |  | A | 0 |
|  | B | 0 |  | → B to F (WINs) | 0 |
|  | C | 0 |  | C | 0 |
|  | D | 0 |  | D | 0 |

METHOD AND SYSTEM FOR MULTILEVEL ARBITRATION IN A NON-BLOCKING CROSSBAR SWITCH

BACKGROUND OF THE INVENTION

1. Technical Field

This invention relates in general to a multiprocessor data processing system and in particular to an improved method and system for arbitrating data transfers between multiple devices connected via electronically isolated buses at a switch. Still more particularly, the present invention relates to a method and system for multilevel arbitration in a non-blocking crossbar switch for handling arbitration within a multiprocessor data processing system.

2. Description of the Related Art

A conventional symmetric multiprocessor data processing system (SMP) may include a number of processors that are each coupled to a shared system bus. Each processor may include on-board cache that provides local storage for instructions and data, execution circuitry for executing instructions, and a bus interface unit (BIU) that supports communication across the shared system bus according to a predetermined bus communication protocol. Typically, in SMP systems, bus devices (i.e. processors, memory controller or I/O hubs) are connected via electronically isolated buses. When one device has a data transfer request for transferring data to another device, a switch, or other interprocessor interconnection medium routes the data from the source device to the correct destination device.

In a multiprocessor system, the functional characteristics of the interprocessor interconnection medium are a significant constraint on system performance. Characteristics sought in the medium include fast access arbitration, fair arbitration (i.e. no unit is starved for access), independence of connections (i.e. a connection between some units does not constrain connections between other units), deadlock prevention, equal opportunity for a processor to send and receive, and modular growth capability.

It is preferable to utilized a non-blocking medium that allows any interconnection that the processors are capable of handling to be made at any time. Such a medium is most versatile and efficient, in that it does not limit the type and number of interconnections between processors that may be made. Also, because the medium allows a plurality of independent connections to exist at a time, such a medium achieves higher communication bandwidth than other media (e.g. a bus). Furthermore, non-blocking media permit direct communication between a source and a destination, and therefore such media do not suffer from the latency of message or packet-passing arrangements wherein establishment of connections depends on self-routing information that must be picked off, decoded, and acted upon in order to effect proper routing.

Because a non-blocking interconnection medium such as a crossbar switch theoretically allows any desired connection between any processors to be made at any time, arbitration of access to the medium itself is not necessary. This situation is unlike typical bus arbitration. In single bus arbitration, the bus is the resource in demand and the destination unit, e.g. processor, is assumed by the arbiter to be available. Conversely, in the situation of a non-blocking interconnection medium, the medium is assumed to be available and the destination unit, or the link(s) connecting the destination unit to the medium, is the resource in demand.

Contention for the destination units, e.g. processors, or their links to the medium, occurs because the units or links themselves may not be capable of handling simultaneous connections from a plurality of units wishing to be connected thereto. For example, a processor is typically capable of being communicatively connected to only one other processor at any time. Hence, there remains the need to arbitrate conflicting multiple requests for access to a unit or link. Therefore, it would be desirable to provide a non-blocking crossbar switch that arbitrates multiple requests for access to a unit or link within a SMP system.

SUMMARY OF THE INVENTION

In view of the foregoing, it is therefore an object of the present invention to provide an improved multiprocessor data processing system.

It is another object of the present invention to provide an improved method and system for arbitrating data transfers between multiple devices connected via electronically isolated buses at a switch.

It is yet another object of the present invention to provide an improved method and system for multilevel arbitration in a non-blocking crossbar switch for handling arbitration within a multiprocessor data processing system.

In accordance with the method and system of the present invention, multiple arbitration controllers are interposed between devices and a switch to which the devices are connected, wherein each of the multiple arbitration controllers are effective to select a data transfer operation and detect collisions between said selected data transfer operations. The switch is enabled for any selected data transfer operations between which collisions are not detected. The switch is also enabled for only one of the selected data transfer operations between which collisions are detected. Any selected data transfer operations for which the switch is not enabled are deferred. The deferred data transfer operations are prioritized within the multiple arbitration controllers, such that for a subsequent selection of the deferred data transfer operations, the switch is enabled for the deferred data transfer operations.

All objects, features, and advantages of the present invention will become apparent in the following detailed written description.

BRIEF DESCRIPTION OF THE DRAWINGS

The invention itself, as well as a preferred mode of use, further objects and advantages thereof, will best be understood by reference to the following detailed description of an illustrative embodiment when read in conjunction with the accompanying drawings, wherein:

FIG. 3 depicts a chart of an example of arbitration selections for the switch of FIG. 2 in accordance with the method and system of the preferred embodiment of the present invention.

DETAILED DESCRIPTION OF THE PREFERRED EMBODIMENT

Figure 1:
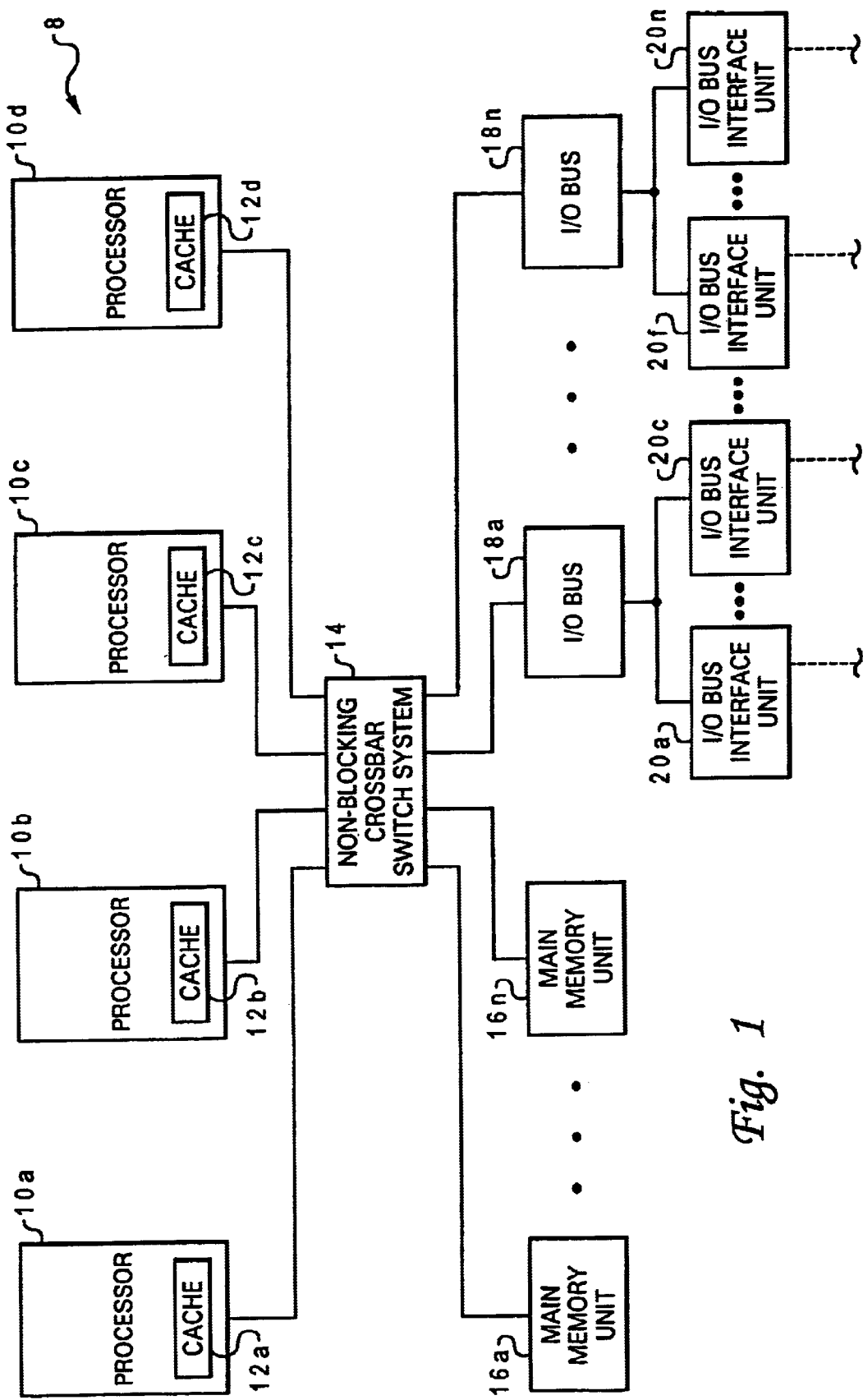
FIG. 1 depicts a high-level block diagram of a multiprocessor system that may utilize a preferred embodiment of the present invention.

Referring now to the drawings and in particular to FIG. 1, there is depicted a high-level block diagram of a multiprocessor system that may utilize a preferred embodiment of the present invention. As depicted, a multiprocessor system 8 includes multiple processors 10a, 10b, 10c and 10d that perform basic machine processing functions on instructions and data from main memory units 16a–16n. Each processor contains or controls multiple levels of cache. For example, in a preferred embodiment, each processor has a separate on-chip level-one (L1) instruction cache, an on-chip L1 data cache, and an on-chip L2 cache directory/controller, the L2 cache itself being on a separate chip. However, these cache structures are depicted conceptually in FIG. 1 as a single block 12a, 12b, 12c and 12d for each respective processor 10a, 10b, 10c and 10d. For the purposes of this invention, the precise implementation details of caching in each processor are not significant and the caches could be implemented in alternate configurations.

Multiple I/O bus interface units 20a–20n communicate with multiple I/O processing units (IOPs) (not shown) through I/O buses 18a–18n, In one embodiment, each system I/O bus 18a–18n is an industry standard PCI bus. The IOPs support communication with a variety of storage and I/O devices, such as direct access storage devices (DASD), tape drives, workstations, printers and remote communications lines for communication with remote devices or other computer systems.

Processors 10a, 10b, 10c, and 10d, main memory units 16a–16n and I/O buses 18a–18n are all connected, preferably via electronically isolated buses, to a non-blocking crossbar switch system 14 that provides a communication path between the devices. Non-blocking crossbar switch system 14 may include multiple levels of non-blocking crossbar switches which arbitrate between multiple operation requests between devices, as will be further described. While the function of a non-blocking crossbar switch will be described in relation to a communication device within the multiprocessor system 8 of FIG. 1, a non-blocking crossbar switch and or system thereof are not limited to the functions depicted in the present embodiment and may be utilized to arbitrate between bus requests for other types of systems.

Figure 2:
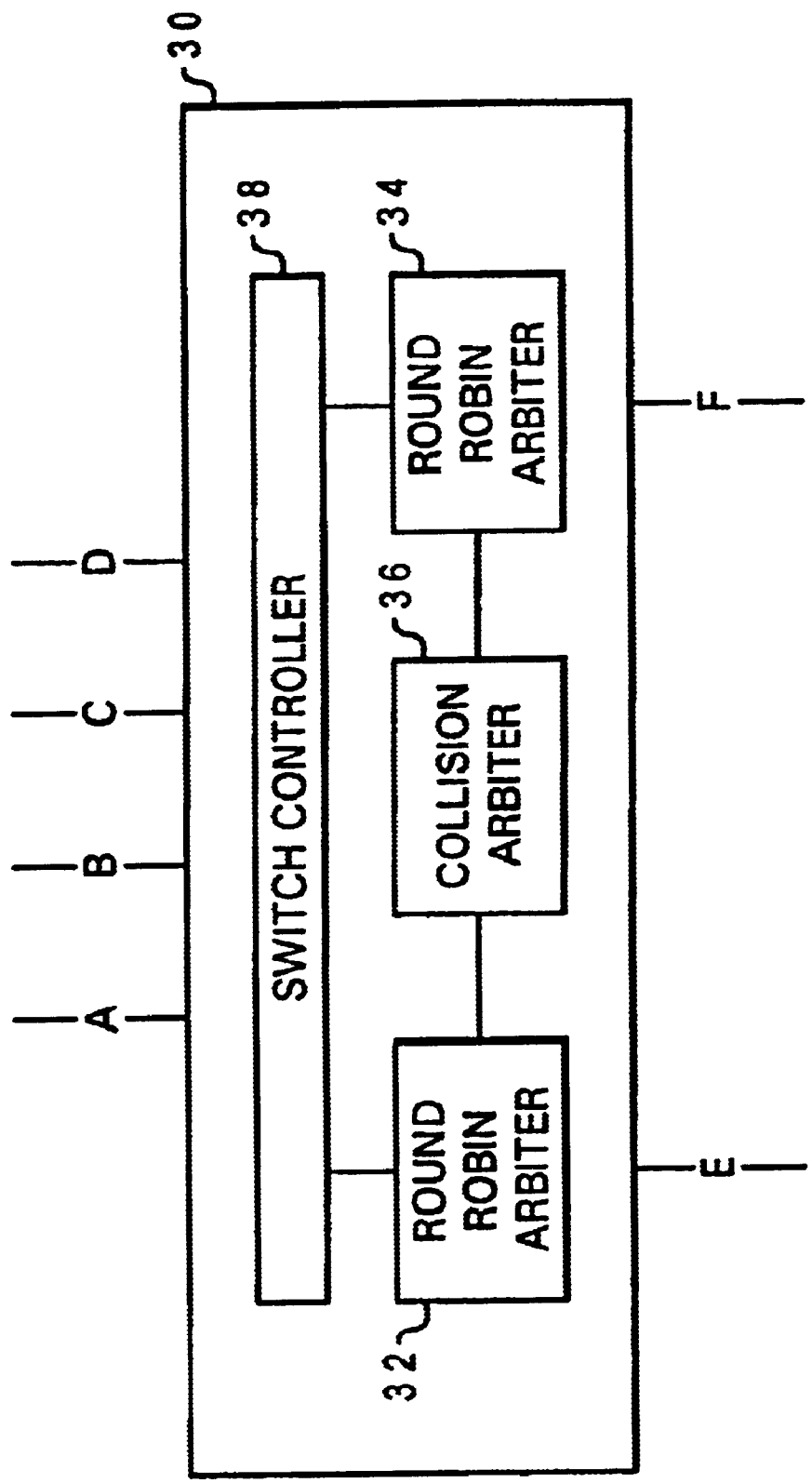
FIG. 2 illustrates a block diagram of an example of a non-blocking crossbar switch in accordance with the method and system of the preferred embodiment of the present invention.

With reference now to FIG. 2, there is depicted a block diagram of an example of a non-blocking crossbar switch. A 6-ported non-block crossbar switch 30 is depicted, wherein ports A, B, C, D, E and F are provided thereto. In the example, ports A, B, C and D are provided for processors and ports E and F are provided for memory devices. While the present example depicts a 6-port switch with ports for four processors and two memory devices for the purposes of example, more complex structures associated with additional processors, I/O hubs or switches on each port may also be constructed.

For crossbar switch 30 to provide non-blocking capability, ports are selected between which requests will be arbitrated. In the example memory port E and memory port F are selected. Further, the types of operations within each level may be distinguished between three categories: processor-memory, memory broadcast and processor broadcast. For example, processor-memory operations associated with port E are: port A to/from port E, port B to/from port E, port C to/from port E, and port D to/from port E. Memory broadcast operations associated with port E are port E to ports A, B, C and D. Processor broadcast operations associated with port E are: port A to ports B/C/D/E, port B to ports A/C/D/E, port C to ports A/B/D/E, and port D to ports A/B/C/E. Similarly, operations associated with port F may be determined.

Each of the selected ports utilizes a round robin arbiter to select between requests utilizing that port. In the example, port E utilizes round robin arbiter 32 and port F utilizes a round robin arbiter 34. Each round robin arbiter stores operation requests until the requests are selected. In addition, each round robin arbiter assigns priority to deferred operation requests, is as will be further described. A collision arbiter 36 selects between selected operation requests from round robin arbiter 32 and round robin arbiter 34 when a collision between the requests is detected, such that the switch is enabled for only one of the colliding operation 28 requests. The collision arbiter may utilize a toggle bit that toggles between the round robin arbiters to select when operation request "wins" for a given cycle. A switch controller 38 enables the switch for all operation requests that win each cycle.

Referring now to FIG. 3, there is depicted a chart of an example of arbitration selections for the switch of FIG. 2. As depicted, for all the operations associated with ports E and F, columns 70 and 72 depict how the round robin arbiters 32 and 34 handle requests. The two arbiters operate independently, choosing a "winner" for bus requests for each time cycle. In particular, each round robin arbiter utilizes control bits from the source device of each request to indicate the type of operations to be performed, i.e. processor-memory, memory broadcast, or processor broadcast.

In addition, a collision arbiter is provided which determines which round-robin arbiter "wins" in the case of a collision between selected operation requests from each round-robin arbiter. The switch is enabled for the operation request that wins. In particular, a collision occurs when two operation requests compete for the same devices. For example, port E may want to broadcast to ports A, B, C and D while port F wants to send data to port C. In this case, the collision occurs in that both ports need access to port C. In order to arbitrate collisions, column. 74 depicts the state of a toggle bit which keeps track of which arbiter won the previous time a collision occurred. Each time a round-robin arbiter wins, the toggle bit is changed to point to the other round-robin arbiter.

Columns depicting the state of priority bits are provided for each device in each round-robin arbiter. As depicted, columns 76 and 78 illustrate the state of priority bits for each of the round robin arbiters. Any operation request that loses is deferred within the round robin arbiter. In addition, the priority bit is set for each operation request in each round-robin arbiter that losses in the collision arbiter. Other operation requests proceed and are handled by the arbitration. The next time that the priority request is selected by the round-robin arbiter, that priority operation request must win arbitration and transfer data. By including the priority bit, possible starvation conditions are eliminated.

In the example depicted, during a first time period N, the toggle bit for the collision arbiter is set to port E. The operation request associated with port E is a processor-memory request from port E to port A and this operation request is selected to win by the port E round-robin arbiter. The operation requests associated with port F are processor-memory requests from port F to port A, from port C to port F and from port D to port F and the port F to port A operation is selected to win by the port F round-robin arbiter. There is a collision detected between the operation requests selected by each round-robin arbiter since both request access to port A. Since the toggle bit is set to select port E to win, the operation request to transfer data from port E to port A is granted. The operation request to transfer data from port F to port A loses, however, the priority bit for the request will be set and the toggle bit switched to port F.

Next, at time N+1, the toggle bit for the collision arbiter is set to port F. The transfer request for data from port E to port A is performed. The operation request associated with port E for transferring data from port B to port E is selected by the port E round-robin arbiter to win. In addition, the operation request associated with port F for transferring from port C to port F is selected by the port F round-robin arbiter to win. Since the operation requests selected do not collide, both requests are selected and the collision arbiter remains constant.

Thereafter, at time N+2, the toggle bit for the collision arbiter is still set to port F. An operation request associated with port E is a memory broadcast operation from port E and is selected to win by the port E round-robin arbiter. The operation request associated with port F for transferring from port D to port F is selected by the port F round-robin arbiter to win. Since the toggle bit is set to select port F to win, the operation request to transfer data from port D to port F is granted. The operation request to broadcast from port E loses, however the priority bit for the request will be set and the toggle bit switched to port E.

Next, at time N+3, the toggle bit for the collision arbiter is set to port E. The operation associated with port E to broadcast from port E is selected by the port E round-robin arbiter to win. The operation associated with port F to transfer data from port F to port A is selected by the port F round-robin arbiter to win. However, there is a collision detected between the operation requests selected by each round-robin arbiter because both request access to port A. Since the toggle bit is set to select port E to win, the operation request to broadcast from port E is granted. The operation. request to transfer from port F to port A loses.

Next, at time N+4, the toggle bit for the collision arbiter is set to port F. The operation associated with port F to transfer data from port F to port A is still selected by the port F round-robin arbiter to win. In particular, when the round-robin arbiter reaches a request with a priority bit set, the request must be granted before the round-robin arbiter can select the next request, such as the port B to port F request. The operation for transferring data from port F to port A is granted. Thereafter, at time N+5, the toggle bit for the collision arbiter is still set to port F. No requests associated with port E have been received. The operation associated with port F to transfer data from port B to port F is selected and granted.

Figure 4:
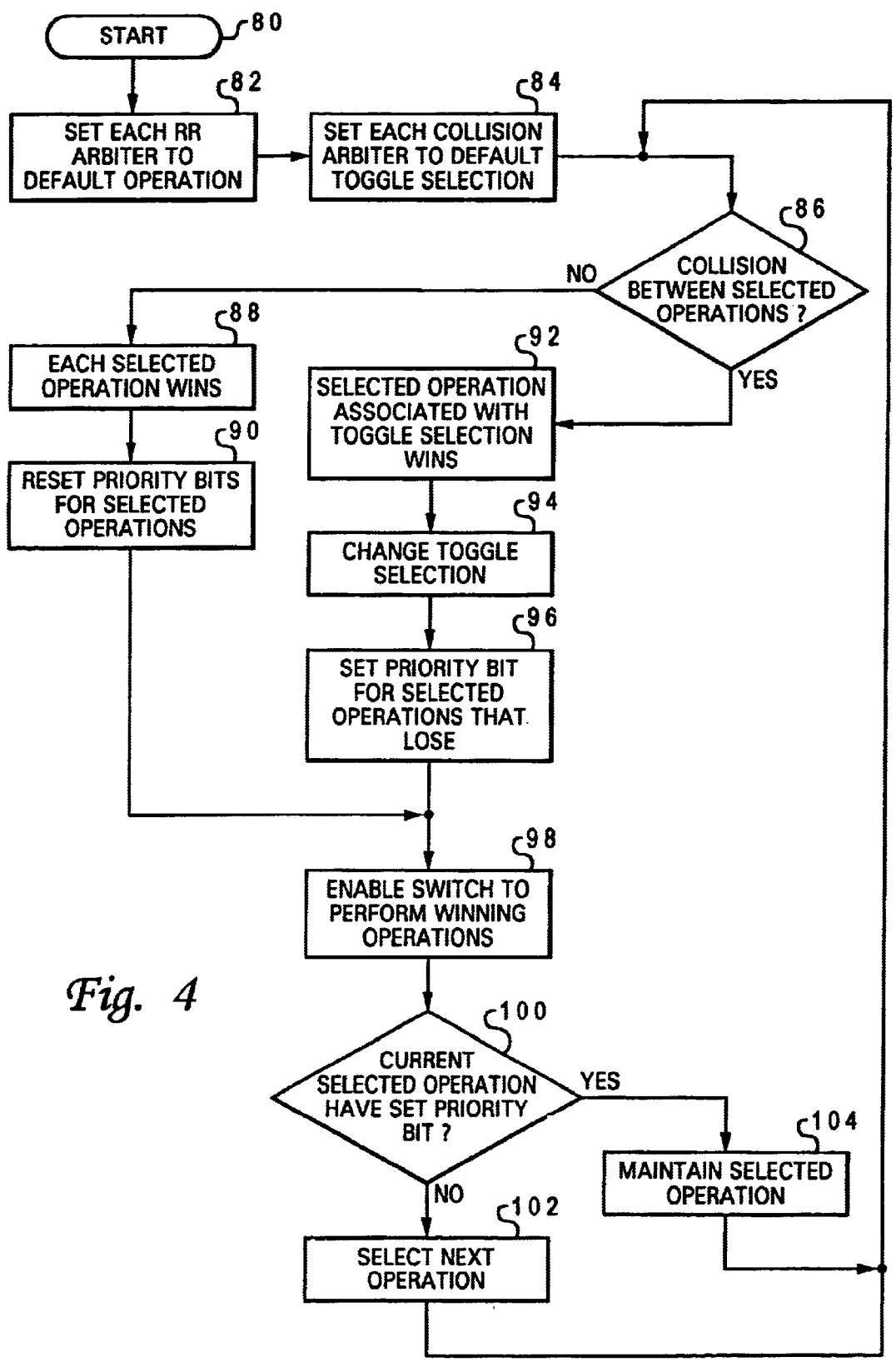
FIG. 4 illustrates a high-level logic flowchart of a process for arbitrating between data transfer requests to a non-blocking crossbar switch in accordance with the method and system of the preferred embodiment of the present invention.

With reference now to FIG. 4, there is illustrated a high-level logic flowchart of a process for arbitrating between data transfer requests to a non-blocking crossbar switch. As depicted, the process starts at block 80 and thereafter passes to block 82. Block 82 illustrates setting each round-robin (RR) arbiter to a default operation. Next, block 84 depicts setting a collision arbiter to a default toggle selection. Thereafter, block 86 illustrates a determination as to whether or not there is a collision between selected operations. If there is not a collision between selected operations, then the process passes to block 88. Block 88 depicts setting each selected operation to win. Thereafter, block 90 illustrates resetting the priority bit for each selected operation to "0" and the process passes to block 98. If there is a collision between selected operations, the process passes to block 92. Block 92 depicts setting the selected operation associated with the toggle selection to win. Next, block 94 illustrates changing the toggle selection. Thereafter, block 96 depicts setting the priority bit for selected operations that lose and the process passes to block 98.

Block 98 illustrates enabling the switch to perform the winning operations. Thereafter, block 100 depicts a determination as to whether or not the current selected operations have set priority bits. If any of the current selected operations have set priority bits, the RR arbitrators with those selected operations maintain the selected operations as depicted at block 104 and the process passes to block 86. If any of the current selected operation do not have set priority bits, the RR arbitrators with those selected operations in advance to select the next operation as illustrated at block 102 and the process passes to block 86.

While the invention has been particularly shown and described with reference to a preferred embodiment, it will be understood by those skilled in the art that various changes in form and detail may be make therein without departing from the spirit and scope of the invention.

What is claimed is:

1. A method for arbitrating data transfers between a plurality of devices connected via electronically isolated buses at a switch, said method comprising the steps of:

interposing a plurality of arbitration controllers between a plurality of devices and a switch having a plurality of ports to which said plurality of devices are connected, each of said plurality of arbitration controllers corresponding to a respective one of a subset of said plurality of ports;

selecting a plurality of data transfer operations in each bus cycle, each data transfer operation being selected independently by a respective one of said plurality of arbitration controllers from among a respective plurality of data transfer operations associated with the respective port to which the respective arbitration controller corresponds;

detecting collisions between said plurality of data transfer operations selected in each bus cycle by said arbitration controllers;

enabling said switch for any of said selected data transfer operations between which collisions are not detected;

enabling said switch, in any given bus cycle, for only one of said selected data transfer operations between which collisions are detected and deferring any said selected data transfer operations for which said switch is not enabled; and prioritizing said deferred selected data transfer operations within said plurality of arbitration controllers, such that for a subsequent selection of said deferred selected data transfer operations said switch is enabled for said deferred selected data transfer operations.

2. The method for arbitrating data transfers according to claim 1, wherein said method further comprises the step of:

switching between said plurality of arbitration controllers for each detected collision between said selected data transfer operations such that only one of said selected data transfer operations between which collisions are detected is selected.

3. The method for arbitrating data transfers according to claim 2, wherein said step of switching between arbitration controllers for each detected collision between said selected data transfer operations further comprises the step of:

maintaining a control bit that designates which of said plurality of arbitration controllers to select, wherein said control bit switches between said plurality of arbitration controllers.

4. The method for arbitrating data transfers according to claim 1, wherein said step of prioritizing said deferred selected data transfer operations within said plurality of arbitration controllers further comprises the step of:

maintaining a priority bit for each of said deferred selected data transfer operations.

5. The method for arbitrating data transfers according to claim 1, wherein said step of prioritizing said deferred selected data transfer operations within said plurality of arbitration controllers further comprises the step of ensuring that said switch is enabled for said prioritized deferred selected data transfer operations prior to selection of the next operation at said plurality of arbitration controllers, in response to selecting said prioritized-deferred selected data transfer operations.

6. A system for arbitrating data transfers between a plurality of devices, said system comprising:

a switch comprising a plurality of ports;

a plurality of devices connected to said plurality of ports of said switch via electronically isolated buses, wherein said switch receives data transfer operations for said plurality of devices;

a plurality of arbitration controllers interposed between said plurality of devices and said switch, each of said plurality of arbitration controllers corresponding to a respective one of a subset of said plurality of ports, wherein each of said plurality of arbitration controllers is effective to independently select a respective data transfer operation in each bus cycle from among a respective plurality of data transfer operations associated with the respective port to which the arbitration controller corresponds;

a collision arbiter interposed between said plurality of arbitration controllers for detecting collisions between data transfer operations which are independently selected in the same bus cycle by different arbitration controllers;

a switch enabling element that enables said switch for any said data transfer operations which are independently selected in the same bus cycle between which collisions are not detected;

said switch enabling element that, for any given bus cycle, enables said switch for only one of said data transfer operations which are independently selected in the same bus cycle between which collisions are detected and defers any selected data transfer operations for which said switch is not enabled;

said plurality of arbitration controllers for prioritizing said deferred selected data transfer operations, such that for a subsequent selection of said deferred selected transfer operations said switch is enabled for said deferred data transfer operations.

7. The system for arbitrating data transfers between a plurality of devices according to claim 6, wherein said plurality of arbitration controllers each comprise at least one round robin arbiter.

8. The system for arbitrating data transfers between a plurality of devices according to claim 6, wherein said collision arbiter utilizes a bit for tracking which of said plurality of arbitration controllers is selected when a collision is detected.

9. The method for arbitrating data transfers according to claim 1, wherein each port of said subset of ports is connected to a respective memory device, and each port of said plurality of ports which is not a member of said subset is connected to a processor device.

10. The system for arbitrating data transfers between a plurality of devices according to claim 6, wherein each port of said subset of ports is connected to a respective memory device, and each port of said plurality of ports which is not a member of said subset is connected to a processor device.

* * * * *